United States Patent
Takahashi

(10) Patent No.: US 9,072,143 B2
(45) Date of Patent: Jun. 30, 2015

(54) LIQUID CRYSTAL DISPLAY DEVICE

(75) Inventor: Satoshi Takahashi, Isumi (JP)

(73) Assignees: JAPAN DISPLAY INC., Tokyo (JP); PANASONIC LIQUID CRYSTAL DISPLAY CO., LTD., Hyogo-Ken (JP)

( * ) Notice: Subject to any disclaimer, the term of this patent is extended or adjusted under 35 U.S.C. 154(b) by 1044 days.

(21) Appl. No.: 13/042,482

(22) Filed: Mar. 8, 2011

(65) Prior Publication Data
US 2011/0221790 A1    Sep. 15, 2011

(30) Foreign Application Priority Data
Mar. 9, 2010    (JP) .................................. 2010-051221

(51) Int. Cl.
G09G 5/10    (2006.01)
H05B 33/08   (2006.01)
G09G 3/34    (2006.01)
G09G 3/36    (2006.01)

(52) U.S. Cl.
CPC .... H05B 33/0824 (2013.01); *G09G 2320/0233* (2013.01); G09G 3/3406 (2013.01); *G09G 3/3648* (2013.01); *G09G 2330/02* (2013.01)

(58) Field of Classification Search
None
See application file for complete search history.

(56) References Cited

U.S. PATENT DOCUMENTS

2007/0013620 A1*  1/2007  Tanahashi et al. ............... 345/82
2009/0189846 A1*  7/2009  Nishikawa et al. ........... 345/102

FOREIGN PATENT DOCUMENTS

JP    2009-175382    8/2009

* cited by examiner

*Primary Examiner* — Jesus Hernandez
(74) *Attorney, Agent, or Firm* — Lowe Hauptman & Ham, LLP

(57) ABSTRACT

The present invention provides a liquid crystal display device comprising a liquid crystal display panel, a backlight having at least one light-emitting diode, and an LED drive circuit for driving the at least one light-emitting diode. The LED drive circuit includes a constant voltage circuit for controlling a voltage outputted from an output terminal in such a manner that a voltage inputted to a feedback terminal becomes a constant voltage, and means for driving the at least one light-emitting diode connected to the output terminal of the constant voltage circuit by a constant current. The LED drive circuit has at least one diode provided in a feedback path lying between the output terminal of the constant voltage circuit and the feedback terminal.

4 Claims, 4 Drawing Sheets

LIQUID CRYSTAL DISPLAY DEVICE

CLAIM OF PRIORITY

The present application claims priority from Japanese Patent Application JP 2010-051221 filed on Mar. 9, 2010, the content of which is hereby incorporated by reference into this application.

BACKGROUND OF THE INVENTION

1. Field of the Invention

The present invention relates to a liquid crystal display device, and particularly to a drive circuit for white light-emitting diodes that configure a light source for a backlight.

2. Description of the Related Art

Liquid crystal display devices of a TFT (Thin Film Transistor) system using thin film transistors (TFTs) as active elements have widely been used as display devices for a personal computer and the like. These liquid crystal display devices each include a liquid crystal display panel, a backlight for illuminating the liquid crystal display panel, a drive circuit for driving the liquid crystal display panel, and a display control circuit.

In a small-sized liquid crystal display device, white light-emitting diodes are used as a light source of a backlight. In the liquid crystal display device using the white light-emitting diodes as the light source for the backlight, an LED drive circuit for driving the white light-emitting diodes current-drives them using a constant voltage circuit (refer to JP-A-2009-175382).

SUMMARY OF THE INVENTION

As described above, the LED drive circuit for driving the white light-emitting diodes current-drives the white light-emitting diodes using the constant voltage circuit.

The conventional LED drive circuit is however accompanied by a problem that since a plurality of transistors are used in parallel or transistors large in allowable loss are used as final-stage transistors for driving the white light-emitting diodes by current, the cost of parts for the LED drive circuit becomes higher.

Further, the small-sized liquid crystal display device needs to shrink or reduce the size of a circuit board equipped with a control IC for configuring a display control circuit, a power supply circuit and an LED drive circuit. In the conventional LED drive circuit, however, the plurality of transistors are used in parallel or the transistors large in allowable loss are used as the final-stage transistors for driving the white light-emitting diodes by current, thus causing a problem that the size of the circuit board equipped with the LED drive circuit becomes larger.

The present invention has been made to solve the problems of the prior art. An object of the present invention is to provide a technology capable of reducing the cost of parts for an LED drive circuit and making smaller the size of a circuit board equipped with the LED drive circuit in a liquid crystal display device using light-emitting diodes as a light source for a backlight.

The above and other objects and novel features of the present invention will be apparent from the description of the present specification and the accompanying drawings.

A summary of a typical one of the invention disclosed in this application will be briefly described as follows:

In order to solve the foregoing problems, there is provided a liquid crystal display device of the present invention, comprising a liquid crystal display panel, a backlight having at least one light-emitting diode, and an LED drive circuit for driving the at least one light-emitting diode, wherein the LED drive circuit includes a constant voltage circuit for controlling a voltage outputted from an output terminal in such a manner that a voltage inputted to a feedback terminal becomes a constant voltage, and means for driving the at least one light-emitting diode connected to the output terminal of the constant voltage circuit by a constant current, and wherein the LED drive circuit has at least one diode provided in a feedback path lying between the output terminal of the constant voltage circuit and the feedback terminal.

Advantageous effects obtained by a typical one of the invention disclosed in the present application will be briefly explained as follows:

According to the present invention, a liquid crystal display device using light-emitting diodes as a light source for a backlight allows for decrease in the cost of parts for an LED drive circuit and reduction in the size of a circuit board equipped with the LED drive circuit.

DESCRIPTION OF THE PREFERRED EMBODIMENTS

Figure 1:
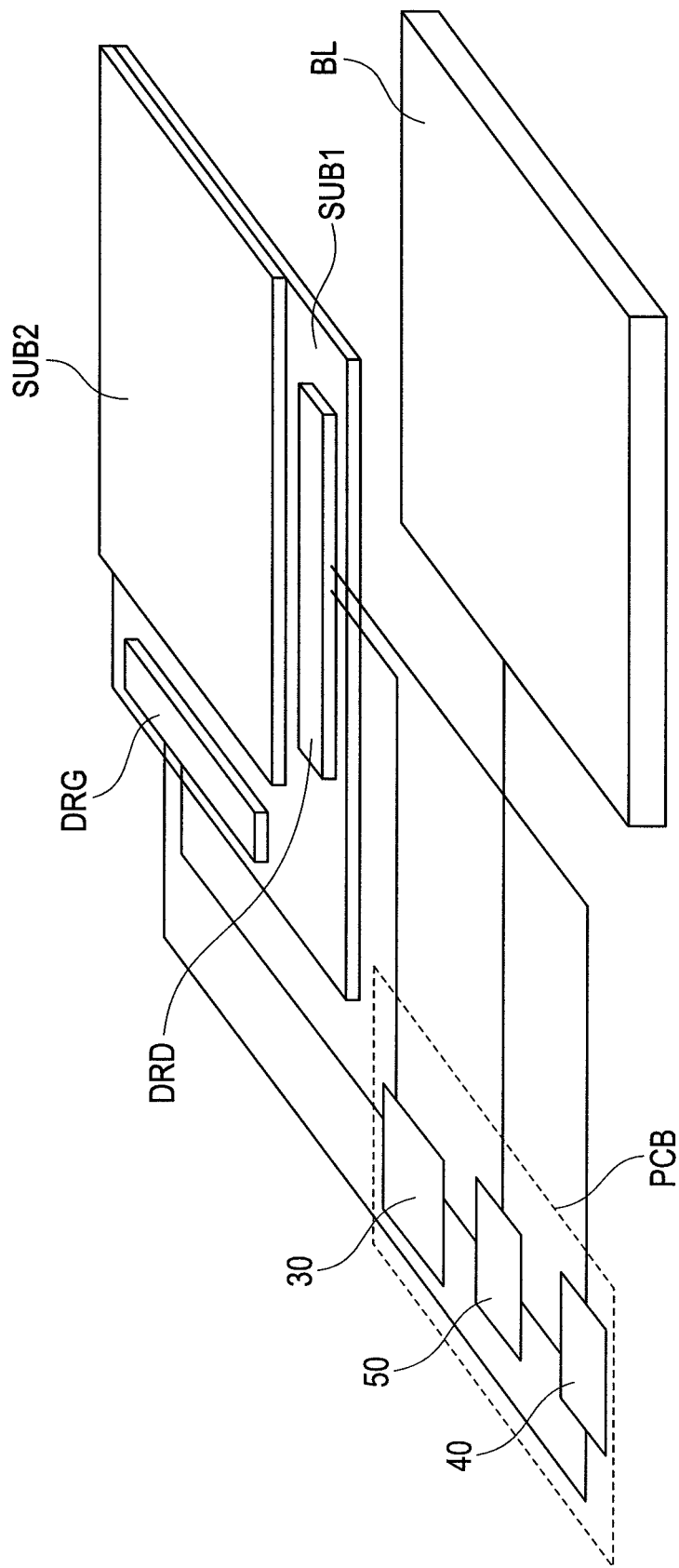
FIG. 1 is a block diagram showing a schematic configuration of a liquid crystal display device according to an embodiment of the present invention.

Preferred embodiments of the present invention will hereinafter be described in detail.

In all drawings for describing the embodiments, components having the same functions as in the above drawings are respectively identified by like reference numerals, and their repetitive explanations will therefore be omitted. The following embodiments are not intended to limit the interpretation of the scope of the claims of the present invention.

[First Embodiment]

FIG. 1 is a block diagram showing a schematic configuration of a liquid crystal display device according to an embodiment of the present invention.

The liquid crystal display device according to the present embodiment has a liquid crystal display panel and a directly-below type backlight (BL). The liquid crystal panel has a first substrate (SUB1) and a second substrate (SUB2). The first substrate (SUB1) is formed with thin film transistors, pixel electrodes, etc. The second substrate (SUB2) is formed with a light shielding film, a color filter, etc. Incidentally, a common electrode is formed in the first substrate (SUB1) if a liquid crystal display panel of a lateral-field system such as an IPS system is adopted. If a liquid crystal display panel of a vertical-field system such as a VA system is adopted, a common electrode is formed in the second substrate (SUB2).

The liquid crystal display panel is configured by laminating the first substrate (SUB1) and the second substrate (SUB2) together through a seal material interposed therebetween and injecting a liquid crystal between the first substrate (SUB1) and the second substrate (SUB2) and sealing therebetween. Polarizing plates (not shown) are respectively provided on the outer sides of the first substrate (SUB1) and the second substrate (SUB2). Incidentally, since the present invention is not directly related to the structure of the liquid crystal display panel, a description will not be made of the structure of the liquid crystal display panel.

A video line drive circuit (DRD) is disposed on the periphery of one of long sides of the first substrate (SUB1), whereas a scanning line drive circuit (DRG) is disposed on the periphery of one of short sides of the first substrate (SUB1).

The video line drive circuit (DRD) and the scanning line drive circuit (DRG) are controlled and driven by a display control circuit (timing controller) 30.

Incidentally, although a description has been given to the case where the video line drive circuit (DRD) and the scanning line drive circuit (DRG) are respectively configured by two semiconductor chips in FIG. 1, the video line drive circuit (DRD) and the scanning line drive circuit (DRG) may be configured by one semiconductor chip.

The back light (BL) has at least one white light-emitting diode (not shown) as a light source. The white light-emitting diode is driven by an LED drive circuit 50. The LED drive circuit 50 receives a control signal from the display control circuit 30.

A power supply circuit 40 supplies voltages for driving respective pixels to the video line drive circuit (DRD) and the scanning line drive circuit (DRG) and supplies an input voltage (Vin) to the LED drive circuit 50.

Figure 5:
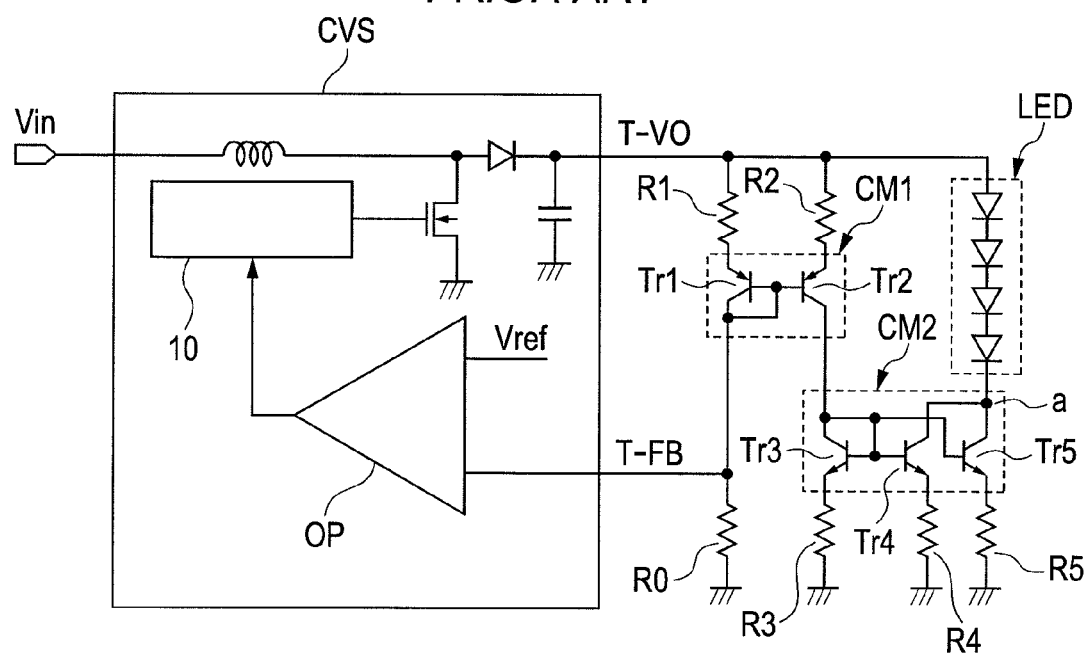
FIG. 5 is a circuit diagram illustrating a circuit configuration of an LED drive circuit of a conventional liquid crystal display device.

FIG. 5 is a circuit diagram showing a circuit configuration of a conventional LED drive circuit. Problems with the conventional LED drive circuit will first be explained using FIG. 5.

The conventional LED drive circuit shown in FIG. 5 comprises a constant voltage circuit (CVS), a first current mirror circuit (CM1), and a second current mirror circuit (CM2). The constant voltage circuit (CVS) has a control circuit 10 and an operational amplifier (OP).

A feedback voltage (FB) inputted to a feedback terminal (T-FB) of the constant voltage circuit (CVS), and a reference voltage (Vref) are inputted to the operational amplifier (OP). The operational amplifier (OP) outputs a voltage corresponding to the difference between the feedback voltage (FB) and the reference voltage (Vref).

The control circuit 10 boosts or steps up the input voltage (Vin), based on the output voltage of the operational amplifier (OP) in such a manner that the feedback voltage (FB) inputted to the feedback terminal (T-FB) becomes a constant voltage (i.e., reference voltage (Vref)), thereby generating an output voltage (Vout). The feedback voltage (FB) is determined by the resistance value (Ro) of a resistive element (R0) and current flowing through the resistive element (R0). Incidentally, the constant voltage circuit (CVS) can easily be configured using a DC-DC converter IC, an LED driver IC having a boosting function, or the like.

A sequence (LED) of a plurality (four) of white light-emitting diodes connected in series is connected to an output terminal (T-VO) of the constant voltage circuit (CVS). The white light-emitting diode sequence (LED) is supplied with the output voltage (Vout) outputted from the constant voltage circuit (CVS).

In the LED drive circuit shown in FIG. 5, an LED drive current (Io) flowing through the white light-emitting diode sequence (LED) is set with the current flowing through the resistive element (R0) as a reference current (Irf).

The first current mirror circuit (CM1) has two PNP type bipolar transistors comprised of an input-side transistor (Tr1) and an output-side transistor (Tr2), and resistive elements (R1 and R2) respectively connected to the emitters of the transistors (Tr1 and Tr2), in which the ratio between the resistance values of the resistive elements R1 and R2 becomes a mirror ratio (hereinafter called first mirror ratio).

The first current mirror circuit (CM1) takes out a current (current corresponding to the first mirror ratio) (I1) corresponding to the reference current (Irf) flowing through the input-side transistor (Tr1) from the output-side transistor (Tr2) and allows the current taken out to flow into the second current mirror circuit (CM2).

The second current mirror circuit (CM2) has three NPN type bipolar transistors comprised of an input-side transistor (Tr3) and output-side transistors (Tr4 and Tr5), and resistive elements (R3 through R5) connected to their corresponding emitters of the transistors (Tr3 through Tr5), in which the ratio between the resistance values of resistive elements of R3 and R4 (or R5) becomes a mirror ratio (second mirror ratio).

The second current mirror circuit (CM2) allows a current (current corresponding to the second mirror ratio) (Io/2) corresponding to the current (I1) flowing through the input-side transistor (Tr3) to flow into the output-side transistors (Tr4 and Tr5) to thereby current-drive the white light-emitting diode sequence (LED). Thus, a required LED drive current (Io) flows through the white light-emitting diodes of the white light-emitting diode sequence (LED) so that the white light-emitting diodes emit light.

When the first mirror ratio is assumed to be M1 and the second mirror ratio is assumed to be M2 here, the LED drive current (Io) equals 2×M1×M2×Irf.

A liquid crystal display device for vehicle use or the like causes rise in ambient temperature. When, however, the LED drive circuit shown in FIG. 5 increases in ambient temperature, the forward voltage of the sequence (LED) of the four white light-emitting diodes decreases, the voltage applied to each of the collectors (point a in FIG. 5) of the transistors (e.g., transistors Tr4 and Tr5) of the final stage increases, and hence power consumption of the final-stage transistors increases.

Assuming that the voltage applied to each of the collectors of the final-stage transistors at 25° C. is 1.5V and the current flowing through the four-type white light-emitting diode sequence (LED) is 100 mA, for example, a transistor loss becomes 1.5V×100 mA=150 mA.

Since the forward voltage of the white light-emitting diode sequence decreases with the rise in the ambient temperature, the voltage applied to each of the collectors for the white light-emitting diode sequence (LED) increases as shown by A in FIG. 8. Since the forward voltage of each white light-emitting diode is reduced by 0.2V at an ambient temperature of 85° C., a voltage of 2.3V (1.5+0.8) increased by 0.8V (0.2×4) is applied to the collectors of the final-stage transistors in the case of the white light-emitting diode sequence (LED) comprised of the four white light-emitting diodes connected in series. Thus, a loss at the ambient temperature of 85° C. becomes (1.5V+0.8V)×100 mA=230 mW.

Figure 6:
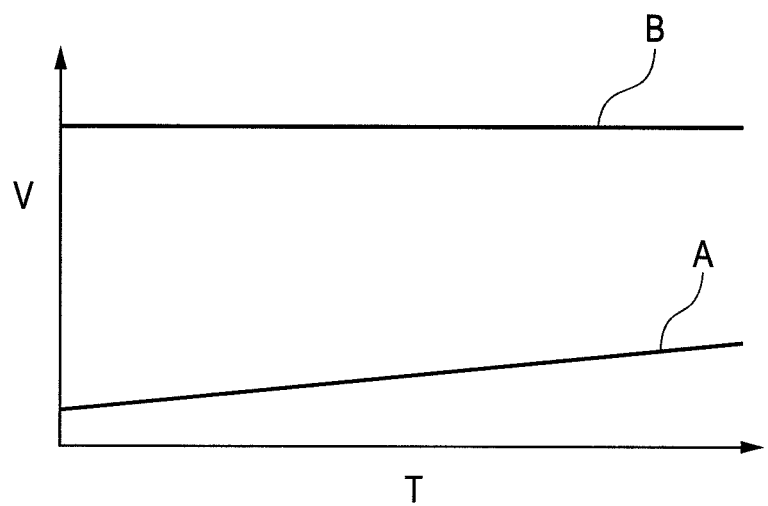
FIG. 6 is a graph showing voltage-temperature characteristics of the conventional LED drive circuit.

Incidentally, FIG. 6 is a graph showing voltage-temperature characteristics of the conventional LED drive circuit shown in FIG. 5. Reference character A indicates a temperature characteristic at the voltage of the point a in FIG. 5, and reference character B indicates a temperature characteristic at the output voltage (Vout) of the constant voltage circuit (CVS).

In this case, it is necessary to select transistors used in consideration of the loss of 230 mW as the final-stage transistors. Further, assuming that the transistors are operated under a condition of ⅓ or less of maximum rating so as to ensure margins relative to their life and power consumption, it is necessary to use two transistors (transistors of Tr4 and Tr5 in FIG. 5) each having a transistor having a transistor loss of from greater than or equal to 230 mW×3=690 mW to 1 W, or a transistor loss of 0.5 W.

Since the conventional LED drive circuit needs to disperse power in this way, there is a need to use the two 1 W transistors or two 0.5 W transistors as the final-stage transistors. The conventional LED drive circuit was accompanied by a problem that the cost of each part for the LED drive circuit would be high.

In contrast, the display control circuit 30, power supply circuit 40 and LED drive circuit 50 shown in FIG. 1 are mounted over a sheet of printed circuit board (PCB of FIG. 1) and disposed on the backside of the liquid crystal display panel. When the liquid crystal display panel is small in size, a corresponding small-sized printed circuit board (PCB) is disposed on the backside of the liquid crystal display panel.

When, however, the two transistors which are 1 W in transistor loss or 0.5 W in transistor loss are used as the final-stage transistors, the occupied area of the final-stage transistors on the printed circuit board (PCB) becomes larger, resulting in an increase of a circuit board size.

As a result, there were problems that the size of the printed circuit board (PCB) became larger than that of the liquid crystal display panel, and the printed circuit board (PCB) would protrude from portions of the liquid crystal display panel where the printed circuit board (PCB) was disposed on the backside of the small-sized liquid crystal display panel.

[First Embodiment]

Figure 2:
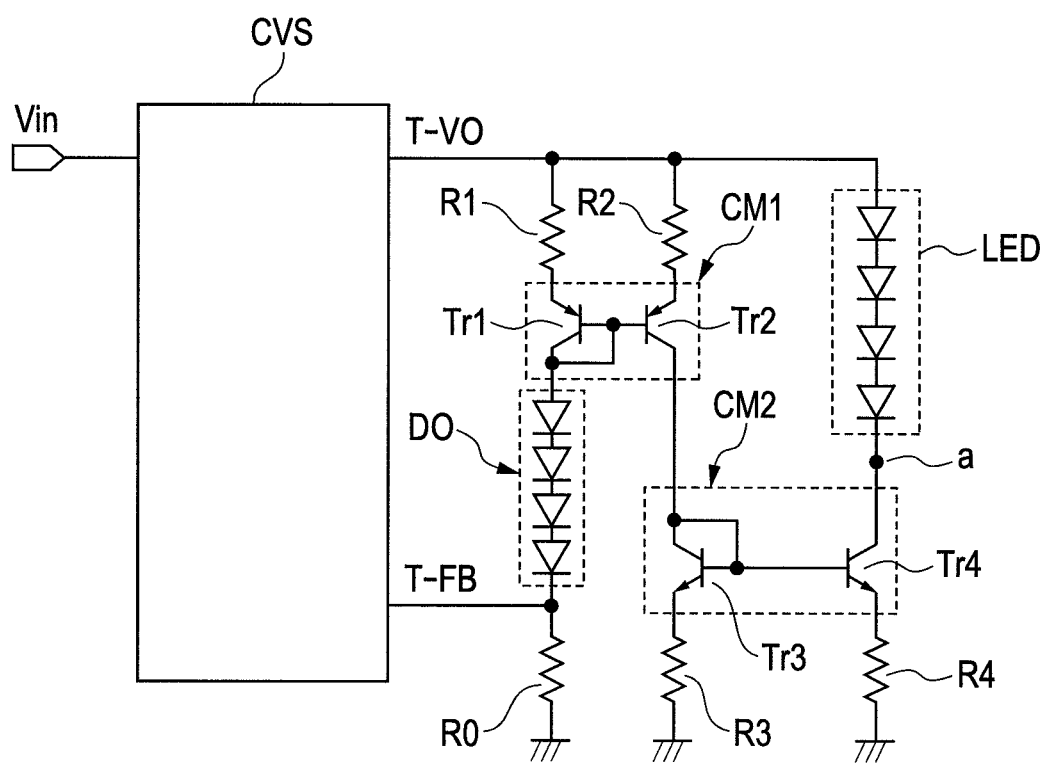
FIG. 2 is a circuit diagram illustrating a circuit configuration of an LED drive circuit according to a first embodiment of the present invention.

FIG. 2 is a circuit diagram showing a circuit configuration of an LED drive circuit 50 of a liquid crystal display device according to a first embodiment of the present invention.

The LED drive circuit according to the present embodiment is different from the LED drive circuit shown in FIG. 5 in that a diode sequence (DO) for compensating for the temperature dependence of the forward voltage of a white light-emitting diode sequence (LED) is connected between the emitter of a transistor (Tr1) and a feedback terminal (T-FB) of a constant voltage circuit (CVS), and a final-stage transistor is configured only by a transistor (Tr4).

Assuming that the voltage applied to the collector of the final-stage transistor at 25° C. is 1.5V and the current flowing through the four-type white light-emitting diode sequence (LED) is 100 mA, for example, a transistor loss becomes 1.5V×100 mA=150 mA even at the LED drive circuit according to the present embodiment.

In the present embodiment, when the ambient temperature rises, the forward voltages of the white light-emitting diodes are reduced, but the forward voltage of the diode sequence (DO) is also reduced. Therefore, a feedback voltage (FB) inputted to the feedback terminal (T-FB) of the constant voltage circuit (CVS) rises. The constant voltage circuit (CVS) controls an output voltage (Vout) outputted from an output terminal (T-VO) in such a manner that the feedback voltage (FB) inputted to the feedback terminal (T-FB) becomes a constant voltage.

Figure 3:
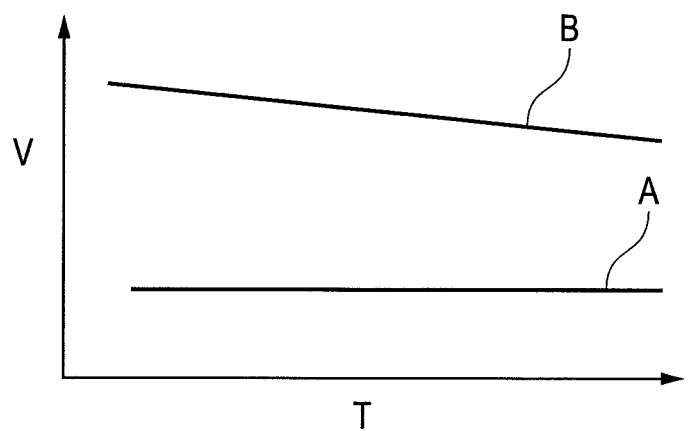
FIG. 3 is a graph showing voltage-temperature characteristics of the LED drive circuit shown in FIG. 2.

Therefore, in the present embodiment, the output voltage (Vout) outputted from the output terminal (T-VO) of the constant voltage circuit (CVS) decreases as shown in B of FIG. 3. Assuming that the temperature dependence of the forward voltage of the white light-emitting diode sequence (LED) is equal to the temperature dependence of the forward voltage of the diode sequence (DO), the voltage applied to the collector for the white light-emitting diode sequence (LED) becomes constant as shown in A of FIG. 3.

Incidentally, FIG. 3 is a graph showing voltage-temperature characteristics of the LED drive circuit according to the present embodiment. Reference character A indicates a temperature characteristic at the voltage of the point a in FIG. 2, and reference character B indicates a temperature characteristic at the output voltage (Vout) of the constant voltage circuit (CVS).

As a result, in the present embodiment, even when the ambient temperature rises to 85° C., for example, the final-stage transistor may be used in consideration of a transistor loss of 150 mA at 25° C. Further, even though the transistor is operated under a condition of ⅓ or less of maximum rating to ensure margins relative to its life and power consumption, the loss becomes 150 mW×3=450 mW and hence only one 0.5 W transistor (transistor Tr4 in FIG. 2) may be used.

Thus, the LED drive circuit according to the present embodiment need not use the two 1 W transistors or the two 0.5 W transistors as the final-stage transistors as in the conventional LED drive circuit. Since only one 0.5 W transistor may be used, the cost of each part for the LED drive circuit can be reduced.

Further, since only one transistor that is 0.5 W in loss may be used as the output-side transistor in the LED drive circuit according to the present embodiment, it is possible to reduce the occupied area of the final-stage transistor on the printed circuit board (PCB) and reduce a circuit board size.

Incidentally, the above description has been made assuming that the temperature dependence of the forward voltage of the white light-emitting diode sequence (LED) is equal to the temperature dependence of the forward voltage of the diode sequence (DO). However, the temperature characteristics of the white light-emitting diodes that configure the white light-emitting diode sequence (LED) do not coincide with the temperature characteristics of the diodes that configure the diode sequence (DO). It is therefore necessary to set the number of the white light-emitting diodes for the white light-emitting diode sequence (LED) and the number of the diodes for the diode sequence (DO) such that the temperature dependence of the forward voltage of the white light-emitting diode sequence (LED) substantially coincides with the temperature dependence of the forward voltage of the diode sequence (DO).

When the forward voltage of each of the white light-emitting diodes that configure the white light-emitting diode sequence (LED) is reduced by 0.2V and the forward voltage of each of the diodes that configure the diode sequence (DO) is reduced by 0.4V, at an ambient temperature of 85° C., for example, the required number of the diodes that configure the diode sequence (DO) is two where the white light-emitting diode sequence (LED) is formed of four the white light-emitting diodes (Example 1).

Even when the forward voltage of each of the white light-emitting diodes that configure the white light-emitting diode sequence (LED) is reduced by 0.2V and the forward voltage of each of the diodes that configure the diode sequence (DO) is reduced by 0.3V, at the ambient temperature of 85° C., the required number of the diodes that configure the diode sequence (DO) is two where the white light-emitting diode sequence (LED) is formed of four the white light-emitting diodes (Example 2).

Even when the forward voltage of each of the white light-emitting diodes that configure the white light-emitting diode sequence (LED) is reduced by 0.2V and the forward voltage of each of the diodes that configure the diode sequence (DO)

is reduced by 0.25V at the ambient temperature of 85° C., the required number of the diodes that configure the diode sequence (DO) is three where the white light-emitting diode sequence (LED) is formed of four the white light-emitting diodes (Example 3).

Incidentally, in the above examples 2 and 3, as shown in A of FIG. 3, the collector voltage of the final-stage transistor (transistor Tr4 in FIG. 2) is not kept constant even if the temperature rises, and the voltage rises according to a rise in temperature as shown in A of FIG. 6.

Since, however, the rate at which the voltage rises according to the rise in temperature, becomes smaller than in the graph shown in A of FIG. 6 even in this case, it is possible to reduce the part cost as compared with the conventional LED drive circuit and make smaller the size of the circuit substrate equipped with the LED drive circuit.

[Second Embodiment]

Figure 4:
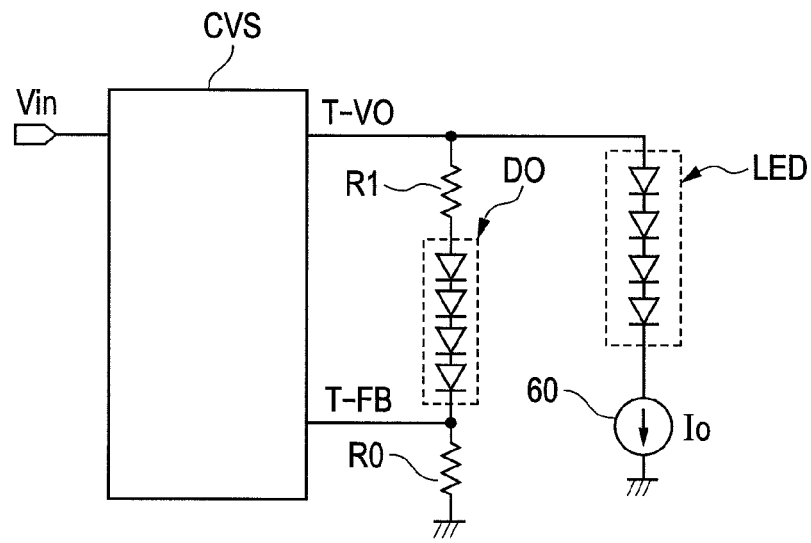
FIG. 4 is a circuit diagram showing a circuit configuration of an LED drive circuit according to a second embodiment of the present invention.

FIG. 4 is a circuit diagram showing a circuit configuration of an LED drive circuit 50 of a liquid crystal display device according to a second embodiment of the present invention.

The LED drive circuit of the present embodiment is configured such that a white light-emitting diode sequence (LED) is connected to an output terminal (T-VO) of a constant voltage circuit (CVS) and current-driven by a constant current source 60.

Even in the present embodiment, a diode sequence (DO) for compensating for the temperature dependence of the forward voltage of the white light-emitting diode sequence (LED) is connected between a resistive element (R1) and a feedback terminal (T-FB) of the constant voltage circuit (CVS) in a feedback path connected to the output terminal (T-VO) of the constant voltage circuit (CVS) and comprised of the resistive element (R1) and a resistive element (R0).

Even in the present embodiment, the part cost can be reduced as compared with the convention LED drive circuit. The size of a circuit board equipped with the LED drive circuit can be made smaller.

While the invention made above by the present inventors has been described specifically on the basis of the embodiments, the present invention is not limited to the embodiments referred to above. It is needless to say that the invention may be modified in various ways within the scope not departing from the gist thereof.

What is claimed is:

1. A liquid crystal display device comprising:
a liquid crystal display panel;
a backlight having at least one light-emitting diode; and
an LED drive circuit for driving said at least one light-emitting diode,
wherein the LED drive circuit includes a constant voltage circuit for controlling a voltage outputted from an output terminal in such a manner that a voltage inputted to a feedback terminal becomes a constant voltage, and a current mirror circuit for making current flow through said at least one light-emitting diode connected to the output terminal of the constant voltage circuit by a constant current,
wherein the LED drive circuit includes at least one diode provided in a feedback path lying between the output terminal of the constant voltage circuit and the feedback terminal,
wherein a reference current flows through the at least one diode in the feedback path,
wherein the reference current does not flow through the at least one light-emitting diode,
wherein the at least one diode is more particularly a first plural sequence of diodes, and the at least one light-emitting diode is more particularly a second plural sequence of light-emitting diodes,
wherein each diode of the first plural sequence of diodes has a temperature dependence characteristic which is different from a temperature dependent characteristic of each light-emitting diode of the second plural sequence of light-emitting diodes, and
wherein a number of diodes in the first plural sequence of diodes is set to have a forward voltage having a temperature dependence characteristic substantially coinciding with a temperature dependence characteristic of a forward voltage of the second plural sequence of light-emitting diodes.

2. A liquid crystal display device comprising:
a liquid crystal display panel;
a backlight having at least one light-emitting diode; and
an LED drive circuit for driving said at least one light-emitting diode,
wherein the LED drive circuit includes a constant voltage circuit for controlling a voltage outputted from an output terminal in such a manner that a voltage inputted to a feedback terminal becomes a constant voltage, a first current mirror circuit having a first transistor and a second transistor, a second current mirror circuit having a third transistor and a fourth transistor, and a resistive element connected to the feedback terminal of the constant voltage circuit,
wherein said at least one light-emitting diode is connected between the output terminal of the constant voltage circuit and the fourth transistor,
wherein a reference current flowing through the first transistor flows through the resistive element,
wherein the second transistor allows a current corresponding to the current flowing through the first transistor to flow through the third transistor,
wherein the fourth transistor allows a current corresponding to the current flowing through the third transistor to flow through said at least one light-emitting diode,
wherein the LED drive circuit includes at least one diode connected between the first transistor and the resistive element,
wherein the reference current does not flow through the at least one light-emitting diode,
wherein the at least one diode is more particularly a first plural sequence of diodes, and the at least one light-emitting diode is more particularly a second plural sequence of light-emitting diodes,
wherein each diode of the first plural sequence of diodes has a temperature dependence characteristic which is different from a temperature dependent characteristic of each light-emitting diode of the second plural sequence of light-emitting diodes, and
wherein a number of diodes in the first plural sequence of diodes is set to have a forward voltage having a temperature dependence characteristic substantially coinciding with a temperature dependence characteristic of a forward voltage of the second plural sequence of light-emitting diodes.

3. A liquid crystal display device comprising:
a liquid crystal display panel;
a backlight having at least one light-emitting diode; and
an LED drive circuit for driving said at least one light-emitting diode,
wherein the LED drive circuit includes a constant voltage circuit for controlling a voltage outputted from an output terminal in such a manner that a voltage inputted to a feedback terminal becomes a constant voltage, a first current mirror circuit which has a first transistor and a second transistor, the first current mirror circuit allowing a current corresponding to a reference current flowing through the first transistor to flow through the second transistor, a second current mirror circuit which has a third transistor and a fourth transistor, the second current mirror circuit allowing a current corresponding to a current flowing through the third transistor to flow through the fourth transistor, and a resistive element connected between the feedback terminal of the constant voltage circuit and a reference voltage, wherein said at least one light-emitting diode is connected between the output terminal of the constant voltage circuit and a second electrode of the fourth transistor, wherein the first and second transistors have first electrodes each connected to the output terminal of the constant voltage circuit, wherein the third transistor has a second electrode connected to a second electrode of the second transistor and a first electrode connected to the reference voltage, wherein the fourth transistor has a first electrode connected to the reference voltage, wherein the LED drive circuit includes at least one diode connected between a second electrode of the first transistor and the resistive element, wherein the reference current does not flow through the light-emitting diode, wherein the at least one diode is more particularly a first plural sequence of diodes, and the at least one light-emitting diode is more particularly a second plural sequence of light-emitting diodes, wherein each diode of the first plural sequence of diodes has a temperature dependence characteristic which is different from a temperature dependent characteristic of each light-emitting diode of the second plural sequence of light-emitting diodes, and wherein a number of diodes in the first plural sequence of diodes is set to have a forward voltage having a temperature dependence characteristic substantially coinciding with a temperature dependence characteristic of a forward voltage of the second plural sequence of light-emitting diodes.

4. A liquid crystal display device according to claim 1, wherein the current mirror circuit is a constant current source for allowing the constant current to flow through said at least one light-emitting diode, the LOE drive circuit includes a resistive element connected to the feedback terminal of the constant voltage circuit, and said at least one light-emitting diode is connected between the output terminal of the constant voltage circuit and the constant current source.

* * * * *